(12) United States Patent
Simell et al.

(10) Patent No.: US 12,291,675 B2
(45) Date of Patent: May 6, 2025

(54) METHOD AND APPARATUS FOR PRODUCING HYDROCARBONS AND USE

(71) Applicant: Teknologian Tutkimuskeskus VTT Oy, Espoo (FI)

(72) Inventors: Pekka Simell, VTT (FI); Muhammad Qureshi, VTT (FI); Elmeri Pienihäkkinen, VTT (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 63 days.

(21) Appl. No.: 17/996,667

(22) PCT Filed: Apr. 19, 2021

(86) PCT No.: PCT/FI2021/050284
§ 371 (c)(1),
(2) Date: Oct. 20, 2022

(87) PCT Pub. No.: WO2021/214384
PCT Pub. Date: Oct. 28, 2021

(65) Prior Publication Data
US 2023/0212461 A1 Jul. 6, 2023

(30) Foreign Application Priority Data

Apr. 20, 2020 (FI) ...................................... 20205397

(51) Int. Cl.
*C10B 49/10* (2006.01)
*B01J 8/18* (2006.01)
(Continued)

(52) U.S. Cl.
CPC .............. *C10B 49/10* (2013.01); *B01J 8/1818* (2013.01); *B01J 8/24* (2013.01); *B01J 23/002* (2013.01);
(Continued)

(58) Field of Classification Search
CPC ......... C10B 49/10; C10B 53/07; C10B 57/06; C10G 1/086; B01J 8/1818; B01J 8/24; B01J 23/002; B01J 23/02
See application file for complete search history.

(56) References Cited

U.S. PATENT DOCUMENTS

| 4,960,440 A | 10/1990 | Betz |
| 5,136,117 A * | 8/1992 | Paisley .................. C10B 53/07 |
| | | 585/648 |

(Continued)

FOREIGN PATENT DOCUMENTS

| GB | 2560317 | 9/2018 |
| JP | 2007056124 | 3/2007 |
| WO | 2021214384 | 10/2021 |

OTHER PUBLICATIONS

"Finland Application No. 20205397 Search Report", Oct. 27, 2020, 2 pgs.

(Continued)

*Primary Examiner* — Jonathan Miller
(74) *Attorney, Agent, or Firm* — DeLizio, Peacock, Lewin & Guerra LLP

(57) ABSTRACT

The invention relates to a method and an apparatus for producing hydrocarbons from plastic containing material, wherein the plastic containing material (1) is subjected into a pyrolysis reactor (2), steam (3) is fed into the pyrolysis reactor, and the plastic containing material is pyrolyzed with the steam by using a catalytic pyrolysis with a basic catalyst to convert the plastic containing material to a product (4) comprising hydrocarbons. Further, the invention relates to the use of the product obtained by the method.

15 Claims, 1 Drawing Sheet

(51) Int. Cl.
*B01J 8/24* (2006.01)
*B01J 23/00* (2006.01)
*B01J 23/02* (2006.01)
*C10B 53/07* (2006.01)
*C10B 57/06* (2006.01)
*C10G 1/08* (2006.01)

(52) U.S. Cl.
CPC ............... *B01J 23/02* (2013.01); *C10B 53/07* (2013.01); *C10B 57/06* (2013.01); *C10G 1/086* (2013.01); *C10G 2300/1003* (2013.01)

(56) References Cited

U.S. PATENT DOCUMENTS

| | | | | |
|---|---|---|---|---|
| 5,208,404 | A * | 5/1993 | Lu | C10G 1/10 585/240 |
| 5,216,149 | A | 6/1993 | Evans et al. | |
| 5,326,919 | A * | 7/1994 | Paisley | C10B 49/22 585/648 |
| 5,364,995 | A * | 11/1994 | Kirkwood | B01J 8/24 585/648 |
| 6,883,442 | B1 | 4/2005 | Groszek et al. | |
| 9,447,332 | B2 * | 9/2016 | Narayanaswamy | B01J 8/1836 |
| 10,059,883 | B2 * | 8/2018 | Lehto | F23G 7/10 |
| 10,927,315 | B2 * | 2/2021 | Ramamurthy | C10G 51/06 |
| 2005/0148487 | A1 | 7/2005 | Brownscombe et al. | |
| 2011/0089081 | A1 * | 4/2011 | Srinakruang | C10G 1/002 208/113 |
| 2014/0228606 | A1 * | 8/2014 | Narayanaswamy | B01J 29/40 585/241 |
| 2015/0166895 | A1 * | 6/2015 | Lehto | C10B 57/06 202/105 |
| 2017/0313826 | A1 * | 11/2017 | Jansen | C08H 8/00 |
| 2019/0177626 | A1 * | 6/2019 | Ramamurthy | C10G 69/06 |
| 2021/0363432 | A1 * | 11/2021 | Bitting | C10B 49/22 |
| 2022/0340819 | A1 * | 10/2022 | Gray | C10B 57/06 |

OTHER PUBLICATIONS

"PCT Application No. PCTFI2021050284 International Search Report and Written Opinion," Jul. 2, 2021, 5 pgs.

Sonawane, Y B. et al., "High Calorific Value Fuel from Household Plastic Waste by Catalytic Pyrolysis", Nature Environment and Pollution Technology, vol. 16, No. 3, pp. 879-882, 2017, 4 pgs.

* cited by examiner

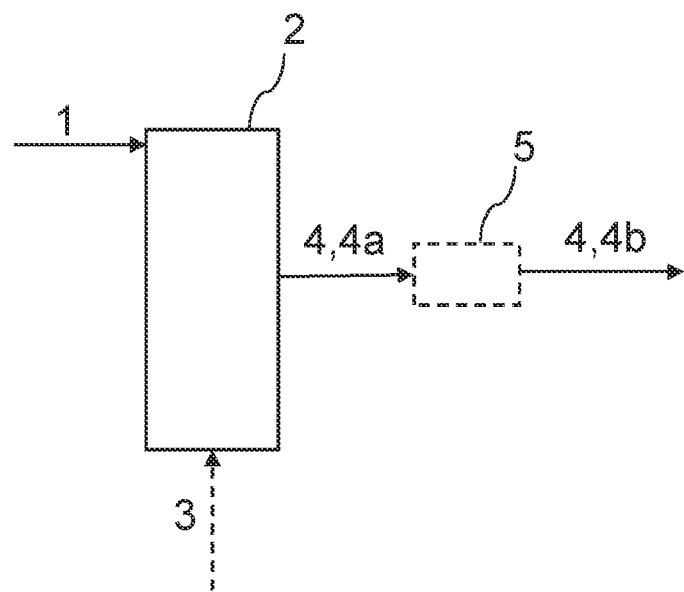

METHOD AND APPARATUS FOR PRODUCING HYDROCARBONS AND USE

FIELD

The application relates to a method defined in claim 1 and an apparatus defined in claim 8 for producing hydrocarbons from plastic containing material. Further, the application relates to a use of the product obtained by the method defined in claim 11.

BACKGROUND

Known from the prior art is to produce liquid products from different raw materials in a pyrolysis process. The raw materials, e.g. polymer containing materials, can be converted to products by applying a catalytic pyrolysis. The catalytic processes are based on acidic catalysts, like zeolites and related aluminosilicates. They result in a high amounts of soot (carbon) and relatively low yields and quality of oil products. Further, when the raw material comprises chlorine or bromine the pyrolysis product, such as gas or oil, has to be cleaned from these impurities before utilization of the product.

OBJECTIVE

The objective is to solve the above problems. Further, the objective is to disclose a new type method and apparatus for treating plastic containing materials and wastes. Further, the objective is to produce desired hydrocarbon product by the pyrolysis. Further, the objective is to improve yield of liquid hydrocarbon product.

SUMMARY

The method and apparatus and use are characterized by what are presented in the claims.

In the method and apparatus, hydrocarbons are produced from plastic containing material by a catalytic pyrolysis.

BRIEF DESCRIPTION OF THE DRAWING

The accompanying drawing, which is included to provide a further understanding of the invention and constitutes a part of this specification, illustrates some embodiments of the invention and together with the description help to explain the principles of the invention. In the drawing:

FIG. 1 is a flow chart illustration of a process according to one embodiment.

DETAILED DESCRIPTION

In a method for producing hydrocarbons from plastic containing material, the method comprises steps: subjecting the plastic containing material (1) into a pyrolysis reactor (2), feeding steam (3) into the pyrolysis reactor, and pyrolyzing the plastic containing material with the steam by using a catalytic pyrolysis with a basic catalyst to convert the plastic containing material to a product (4) comprising hydrocarbons, such as to a liquid hydrocarbon product.

An apparatus for producing hydrocarbons from plastic containing material comprises a pyrolysis reactor (2) which comprises a basic catalyst and in which the plastic containing material (1) is pyrolyzed with steam by using a catalytic pyrolysis with the basic catalyst to convert the plastic containing material (1) to a product (4) comprising hydrocarbons, such as a liquid hydrocarbon product, and at least one inlet for subjecting the plastic containing material (1) into the pyrolysis reactor (2), and at least one feeding device for feeding the steam (3) into the pyrolysis reactor.

Some embodiments of the method and the apparatus are shown in FIG. 1.

In this context, the plastic containing material (1) means any material, recycled material, residue material or waste material, which contains plastic, plastic type material, polymers, e.g. plastic type polymers, mixtures of plastics and/or polymers or the like. In one embodiment, the plastic containing material is selected from the group consisting of recycled plastic containing material, plastic containing waste, plastic containing residue material and their combinations. The plastic containing material can comprise one or more components. The plastic containing material can comprise also other materials than plastic, polymers or plastic type materials.

In one embodiment, the plastic containing material (1) may comprise polyethylene, polypropylene, PVC, other plastics, other polymer components, or their combinations. In one embodiment, the plastic containing material may comprise impurities. In one embodiment, the plastic containing material comprises impurities including chlorine, bromine and/or sulfur. In one embodiment, the impurities including chlorine, bromine and/or sulfur are captured by the basic catalyst during the catalytic pyrolysis.

In this context, the product (4) comprising hydrocarbons means any product which is formed by the catalytic pyrolysis with the basic catalyst and which comprises hydrocarbons. In one embodiment, the product (4) comprising hydrocarbons is a liquid hydrocarbon product, such as pyrolysis oil. In one embodiment, pyrolysis product is in a gaseous form, such as pyrolysis gas, just after the pyrolysis reactor (2). In one embodiment, the pyrolysis product is at least partly in a liquid form after the pyrolysis reactor (2). In one embodiment, if the pyrolysis product is in the gaseous form, it may be condensed to form the liquid hydrocarbon product after the pyrolysis reactor. Preferably, the product (4) comprising hydrocarbons comprises at least liquid hydrocarbons. Further, the product may comprise other hydrocarbons, compounds or components, such as gas, wax and/or char. The product comprising hydrocarbons can consist of one or more main components. In one embodiment, the product comprises at least the liquid hydrocarbons and wax. In one embodiment, the product comprises at least the liquid hydrocarbons and gas. In one embodiment, the product comprises at least the liquid hydrocarbons and char. In one embodiment, the product comprises at least the liquid hydrocarbons, gas, wax and char. In one embodiment, the product (4) comprising hydrocarbons is recovered. In one embodiment, the product can contain 40-90% liquid hydrocarbons. In one embodiment, the liquid hydrocarbon product comprises middle distillates. Alternatively, the liquid hydrocarbon product may comprise other hydrocarbon compounds or fractions.

In one embodiment, the steam (3) is fed from a bottom of the pyrolysis reactor (2). In one apparatus embodiment, the steam (3) is arranged to be fed via a bottom of the pyrolysis reactor (2) into the pyrolysis reactor (2). In one embodiment, the apparatus comprises a distribution device, e.g. plate, plate with holes, grate, baffle or the like, to distribute the steam in the pyrolysis reactor.

In one embodiment, the basic catalyst, e.g. dolomite or other basic material, is fed into the pyrolysis reactor. In one embodiment, the basic catalyst is added as a fresh makeup catalyst feed into the pyrolysis reactor during the pyrolysis.

In one embodiment, the apparatus comprises at least one catalyst feeding device for feeding the basic catalyst into the pyrolysis reactor. The catalyst feeding device can be selected from any suitable feeding device, feeder or similar device known per se. In one embodiment, the used basic catalyst which flows out from the pyrolysis reactor and/or which is recovered from the pyrolysis reactor is recirculated back to the pyrolysis reactor, e.g. directly or via reforming. In one embodiment, the used basic catalyst is discharged and/or recovered from filters, cyclones or the like, in which solids are separated from the product or product vapors, after the pyrolysis reactor. In one embodiment, the basic catalyst is discharged and/or recovered from the bottom of the pyrolysis reactor, e.g. by means of a screw.

In one embodiment, the plastic containing material (1) and the steam (3) are mixed to form a mixture in the pyrolysis reactor (2). In one embodiment, the plastic containing material (1) and the steam (3) can get mixed in the pyrolysis reactor. It is important that the catalytic pyrolysis with the basic catalyst is carried out in presence of the steam.

In one embodiment, temperature is 450-700° C., in one embodiment 450-650° C., in one embodiment 500-650° C., in one embodiment 550-650° C., and in one embodiment 570-630° C., during the catalytic pyrolysis in the pyrolysis reactor (2).

In one embodiment, residence time is 0.5-3.0 seconds in the catalytic pyrolysis. In one embodiment, the residence time is 1 or over 1 seconds in the catalytic pyrolysis. In one embodiment, the residence time is 1.0-2.8 seconds in the catalytic pyrolysis.

In one embodiment, the pyrolysis reactor (2) is a fluidized bed reactor. In one embodiment, the pyrolysis reactor (2) is a bubbling fluidized bed reactor. In one embodiment, the pyrolysis reactor (2) is a circulating fluidized bed reactor. Alternatively, any suitable pyrolysis reactor can be used.

A fluidizing gas is used in the fluidized bed reactor. In one embodiment, the fluidizing gas is subjected to the pyrolysis reactor (2). In one embodiment, the steam (3) is used at least partly as the fluidizing gas. In one embodiment, the fluidizing gas is a composition containing the steam and/or nitrogen. Further, in one embodiment, the fluidizing gas may comprise other components. In one embodiment, nitrogen is used as the fluidizing gas. In one embodiment, the fluidizing gas comprises the steam. In one embodiment, the steam is added to the fluidizing gas. Adding the steam to the fluidizing gas results in improved liquid yield, such as pyrolysis oil yield, and quality. In one embodiment, the fluidizing gas comprises below 50 vol-% steam, in one embodiment 0.1-30 vol-%, in one embodiment 10-20 vol-% steam. In one embodiment, the fluidizing gas and the steam are subjected separately into the pyrolysis reactor.

In one embodiment, heat to the catalytic pyrolysis and/or catalyst bed is provided indirectly by heating the catalyst material and/or steam in another device.

In one embodiment, the basic catalyst is selected from the group consisting of dolomite, e.g. calcined dolomite, limestone or other basic materials. The basic catalyst can be used as such or as a mixture with sand. In one embodiment, the catalyst of the pyrolysis reactor comprises the basic catalyst and sand. The basic catalyst, such as dolomite or limestone, adsorbs the most common impurities, like halogenides and sulfur, during the catalytic pyrolysis, and then this catalytic pyrolysis process is suitable also for contaminated plastic waste. Further, the basic catalyst acts as a steam reforming catalyst enhancing the reaction of gas phase intermediate pyrolysis product and steam, which stops the polymerization of the hydrocarbons and thus also the build up of heavy molecular weight products and soot. In one embodiment, CaO and MgO of the dolomite catalyst act as halogenide and sulfur adsorbents. Preferably, the basic catalyst has the following properties in the catalytic pyrolysis in the presence of steam: it depolymerizes by abstracting hydrogen from the polymer, it prevents further re-polymerization, and/or it acts as the absorbent.

In one embodiment, the product (4) which comprises hydrocarbons is in the gaseous form (4a) after the pyrolysis reactor (2), and the gaseous product is condensed in a condenser (5) to form the liquid hydrocarbon product.

In one embodiment, the inlet for subjecting the plastic containing material (1) into the pyrolysis reactor (2) may be selected from any suitable inlet known per se, e.g. pipe, port or the like. In one embodiment, the plastic containing material is fed using a screw feeder to the pyrolysis reactor. Alternatively, any suitable feeder can be used to feed the plastic containing material to the pyrolysis reactor. In one embodiment, the feeder is selected from a screw feeder, silo feeder, hydraulic feeder, pneumatic feeder, melt feeder and their combinations.

In one embodiment, the feeding device, such as steam feeding device, for feeding the steam into the pyrolysis reactor (2) may be selected from any suitable feeding device, feeder or similar device known per se. In one embodiment, the steam can be supplied to the pyrolysis reactor by means of a steam generator and pipe. In one embodiment, the steam is fed through a grid.

Further, in one embodiment, the apparatus comprises at least one outlet for discharging the product (4) from the pyrolysis reactor (2). The outlet may be any suitable outlet known per se, e.g. pipe, outlet port or the like.

In one embodiment, the product (4) comprising hydrocarbons, such as liquid hydrocarbon product, can be treated, post-treated or supplied to a next process or a next process step after the catalytic pyrolysis. In one embodiment, the product (4) comprising hydrocarbons is treated by the condensation to form the liquid hydrocarbon product. In one embodiment, the product (4) comprising hydrocarbons or the liquid hydrocarbon product is treated by a synthesis or a refinery process to form a final product after the pyrolysis reactor.

In one embodiment, the method and apparatus are based on a continuous process. In one embodiment, the method and apparatus can be based on a batch process.

In one embodiment, the method and apparatus can be used to produce the liquid hydrocarbon products for forming middle distillates, fuels, monomers or chemicals, for feed to refinery, polymerization or material manufacturing, or to their combinations.

In one embodiment, the product comprising hydrocarbons, such as the liquid hydrocarbon product, is used as a hydrocarbon component for forming middle distillates, fuels, monomers or chemicals, or as a feed to refinery, polymerization or material manufacturing, or in their combinations.

Thanks to the invention, the high yield of liquid hydrocarbon product can be obtained. Different plastic containing materials can be used as raw material. The catalytic pyrolysis with the basic catalyst is suitable to treat also contaminated plastic waste. Problematic compounds, such as chlorine, bromine and sulfur, can be captured by the basic catalyst material. Further, the products with improved quality can be produced.

The method and apparatus offer a possibility to produce liquid hydrocarbon product from plastic containing materials with good properties easily, and energy- and costeffectively. The present invention provides an industrially applicable, simple and affordable way to produce desired pyrolysis oil products from different plastic containing materials. The method and apparatus are easy and simple to realize in connection with production processes. Thus, the present invention improves waste plastic recycling.

EXAMPLES

FIG. 1 presents some embodiments of the process for producing hydrocarbons from plastic containing material (1).

The apparatus comprises a fluidized bed pyrolysis reactor (2) which comprises a basic catalyst, such as dolomite or limestone, and in which the plastic containing material (1) is pyrolyzed with steam by using a catalytic pyrolysis with the basic catalyst. The plastic containing material comprises at least one plastic or plastic type polymer. Alternatively, the plastic containing material is a mixture of different plastics and/or polymers. The apparatus comprises at least one inlet for subjecting the plastic containing material (1) into the pyrolysis reactor (2), and at least one feeding device for feeding the steam (3) from a bottom of the pyrolysis reactor into the pyrolysis reactor (2).

In the pyrolysis reactor (2), the plastic containing material and the steam are mixed to form a mixture. The temperature of 450-700° C., e.g. 480-550° C. or at at around 500° C., can be used during the catalytic pyrolysis. Further, the catalyst comprises at least dolomite or limestone, and further the catalyst may comprise sand. A fluidizing gas is used in the fluidized bed pyrolysis reactor (2). The steam (3) can be used at least partly as the fluidizing gas in the reactor. Alternatively, the fluidizing gas comprises nitrogen and/or oxygen, and the steam is subjected separately into the pyrolysis reactor. During the pyrolysis the plastic containing material is converted to a product (4) comprising hydrocarbons. If the product (4) is in the gaseous form (4a), such as pyrolysis gas, the product can be treated by a condensation (5) for forming a liquid product (4b).

Example 1

In this example, plastic containing material was treated in a fluidized bed pyrolysis reactor which comprises dolomite (D) as a basic catalyst and bed material. The plastic containing material, which comprises polypropylene, was pyrolyzed with steam by using a catalytic pyrolysis with the dolomite. In comparative experiments, the pyrolysis was carried out without steam and/or the dolomite.

In this example, nitrogen (N) or a mixture of nitrogen (N) and steam (S) was used as a fluidizing gas. Temperatures were 500° C. and 600° C. during the catalytic pyrolysis, and residence times were 1, 2.4 and 2.8 seconds. In comparative experiments, an inert material (I) was used as a bed material.

The process conditions and compositions of the products are presented in Table 1.

TABLE 1

| Process conditions | | | | | | | |
|---|---|---|---|---|---|---|---|
| Bed material, catalyst | D | D | D | D | D | I | I |
| Fluidizing gas | N | N + S | N + S | N + S | N + S | N | N + S |
| Temperature, °C. | 600 | 600 | 600 | 600 | 500 | 600 | 600 |
| Residence time, s | 1 | 1 | 1 | 2.4 | 2.8 | 1 | 1 |
| Product composition, mass balance, wt % dry basis | | | | | | | |
| Char [1] | −5.1 | 5.9 | −5.6 | −5.4 | −1.0 | 0.0 | −0.1 |
| Pyrolysis gases | 20.4 | 24.2 | 26.4 | 26.4 | 4.1 | 18.5 | 14.6 |
| Waxes + liquids | 61.7 | 66.2 | 70.5 | 68.3 | 90.5 | 57.3 | 79.8 |
| Waxes | 43.7 | 13.9 | 19.5 | 0.1 | 79.6 | 38.7 | 79.8 |
| Liquids | 18.0 | 52.3 | 51.0 | 68.2 | 10.9 | 18.6 | 0.0 |
| Mass balance closure | 77.0 | 96.3 | 91.3 | 89.3 | 93.6 | 75.8 | 94.3 |

In the table, D is dolomite, I is inert material, S is steam, and N is nitrogen.
[1] Char yield on the bed material is calculated by weighing the bed material before and after the experiment.

From the test it was observed that the plastic containing material can be converted effectively to liquid hydrocarbons, especially when the mixture of nitrogen and steam was used during the catalytic pyrolysis. Further, it was observed that a yield of the liquid hydrocarbons can be increased when the residence time was longer.

The pyrolysis reactor, inlet, feeding devices, and condenser and other devices and equipments of the process used in FIG. 1 are known per se in the art, and therefore they are not described in any more detail in this context.

The method and apparatus are suitable in different embodiments for producing hydrocarbons, such liquid hydrocarbon product, from different plastic containing waste materials by means of catalytic pyrolysis process.

The invention is not limited merely to the examples referred to above; instead many variations are possible within the scope of the inventive idea defined by the claims.

The invention claimed is:

1. A method for producing hydrocarbons from plastic containing material, wherein the method comprises:
   subjecting the plastic containing material into a fluidized bed pyrolysis reactor;
   feeding steam, used at least in part as a fluidizing gas, into the fluidized bed pyrolysis reactor; and
   pyrolyzing the plastic containing material with the steam at a residence time of 0.5-3.0 seconds by using a catalytic pyrolysis with a basic catalyst to convert the plastic containing material to a product comprising hydrocarbons, wherein the basic catalyst is selected from the group consisting of dolomite and limestone; and
   wherein the product comprising hydrocarbons is a liquid hydrocarbon product and a yield of hydrocarbon liquid is higher than a yield of hydrocarbon wax.

2. The method according to claim 1, wherein the liquid hydrocarbon product comprises middle distillates.

3. The method according to claim 1, wherein feeding the steam into the fluidized bed pyrolysis reactor comprises feeding the steam from a bottom of the fluidized bed pyrolysis reactor.

4. The method according to claim 1, wherein the basic catalyst is added as a fresh makeup catalyst feed into the fluidized bed pyrolysis reactor during the pyrolysis.

5. The method according to claim 1, comprising mixing the plastic containing material and the steam to form a mixture in the fluidized bed pyrolysis reactor.

6. The method according to claim 1, wherein a temperature is 450-650° C. during the catalytic pyrolysis in the fluidized bed pyrolysis reactor.

7. The method according to claim 1, wherein the product which comprises hydrocarbons is in the gaseous form after the fluidized bed pyrolysis reactor, and the gaseous product is condensed in a condenser to form the liquid hydrocarbon product.

8. An apparatus for producing hydrocarbons from plastic containing material, wherein the apparatus comprises:
   a fluidized bed pyrolysis reactor which comprises a basic catalyst and in which the plastic containing material is pyrolyzed with steam at a residence time of 0.5-3.0 seconds by using a catalytic pyrolysis with the basic catalyst to convert the plastic containing material to a product comprising hydrocarbons, wherein the basic catalyst is selected from the group consisting of dolomite and limestone;
   at least one inlet for feeding the plastic containing material into the fluidized bed pyrolysis reactor; and
   at least one feeding device for feeding the steam into the fluidized bed pyrolysis reactor, wherein the steam is used at least partly as a fluidizing gas; and
   where e product comprising hydrocarbons is a liquid hydrocarbon product, and a yield of hydrocarbon liquid is higher than a yield of hydrocarbon wax.

9. The apparatus according to claim 8, wherein the steam is arranged to be fed via a bottom of the fluidized bed pyrolysis reactor.

10. The apparatus according to claim 8, wherein the plastic containing material and the steam are mixed in the fluidized bed pyrolysis reactor.

11. A method comprising:
   producing a product containing hydrocarbons from plastic containing material that is subjected into a fluidized bed pyrolysis reactor, wherein the plastic containing material is pyrolyzed with steam that is fed into the fluidized bed pyrolysis reactor at a residence time of 0.5-3.0 seconds by using a catalytic pyrolysis with a basic catalyst to convert the plastic containing material to the product, wherein the basic catalyst is selected from the group consisting of dolomite and limestone and wherein the steam is used at least partly as a fluidizing gas; and
   using the product comprising hydrocarbons as a hydrocarbon component in an operation that comprises at least one of an operation to form middle distillates, fuels, monomers or chemicals, and an operation to a feed to refinery, polymerization or material manufacturing; and
   wherein the product comprising hydrocarbons is a liquid hydrocarbon product, and a yield of hydrocarbon liquid is higher than a yield of hydrocarbon wax.

12. The method according to claim 11, wherein the liquid hydrocarbon product comprises middle distillates.

13. The method according to claim 11, wherein the steam is fed from a bottom of the fluidized bed pyrolysis reactor.

14. The method according to claim 11, wherein the basic catalyst is added as a fresh makeup catalyst feed into the fluidized bed pyrolysis reactor during the pyrolysis.

15. The method according to claim 11, wherein the plastic containing material and the steam are mixed to form a mixture in the fluidized bed pyrolysis reactor.

* * * * *